United States Patent [19]
Dowe

[11] Patent Number: 5,337,110
[45] Date of Patent: Aug. 9, 1994

[54] ELECTROMAGNETIC ACTUATOR

[75] Inventor: David R. Dowe, Holley, N.Y.

[73] Assignee: Eastman Kodak Company, Rochester, N.Y.

[21] Appl. No.: 162,732

[22] Filed: Dec. 6, 1993

[51] Int. Cl.$^5$ .......................... G03B 9/04; G03B 9/08
[52] U.S. Cl. .................. 354/230; 354/234.1; 354/271.1; 335/219
[58] Field of Search ............ 354/229, 230, 231, 234.1, 354/250, 271.1; 335/81, 219, 234

[56] References Cited

U.S. PATENT DOCUMENTS

| | | | |
|---|---|---|---|
| 3,594,061 | 7/1971 | Selvage | 354/600 |
| 4,060,313 | 11/1977 | Kondo | 354/234.11 X |
| 4,121,235 | 10/1978 | Fujita et al. | 350/234.1 |
| 4,171,897 | 10/1979 | Fujita et al. | 350/234.1 |
| 4,265,530 | 5/1981 | Peterson | 354/463 |
| 4,325,619 | 4/1982 | Seckendorf et al. | 354/250 X |
| 4,326,786 | 4/1982 | Uchiyama et al. | 354/234.1 |
| 4,378,146 | 3/1983 | Suzuki et al. | 354/4451 X |
| 4,558,368 | 12/1985 | Aoki et al. | 358/228 |
| 4,658,230 | 4/1987 | Yamamoto | 335/234 |
| 4,671,638 | 1/1987 | Capobianco et al. | 354/234.1 |
| 4,881,093 | 11/1989 | Dowe | 354/234.1 |
| 4,935,659 | 6/1990 | Naka et al. | 354/234.1 X |
| 4,952,859 | 8/1990 | Torisawa et al. | 318/696 |
| 5,150,149 | 9/1992 | Alligood et al. | 354/441 |
| 5,155,522 | 10/1992 | Castor et al. | 354/456 |
| 5,159,382 | 10/1992 | Lee et al. | 354/435 |

FOREIGN PATENT DOCUMENTS 63-36228 2/1988 Japan .
63-36229 2/1988 Japan .

*Primary Examiner*—Michael L. Gellner
*Assistant Examiner*—J. K. Han
*Attorney, Agent, or Firm*—David A. Howley

[57] ABSTRACT

An electromagnetic actuator that utilizes magnetic attractive and repulsive forces through the interaction of permanent magnetic and electromagnetic fields for moving an aperture/shutter blade or an aperture blade for setting the aperture for an exposure of an image through an imaging aperture. The actuator includes a base for supporting two permanent magnets which are arranged to rotate on a common axis in opposition to each other and under the influence of forward and reverse direction magnetic fields generated by an armature in response to respective forward and reverse direction currents. The first and second magnets are coupled to a blade at first and second pivot points, respectively, which pivot the blade from a stable rest position of said blade with respect to the imaging aperture to first and second aperture setting positions in response to prescribed rotation of the first and second magnets within defined limits. At least two aperture setting positions are provided by applying the forward and reverse drive current to the electromagnet coil in a mono-stable mode, whereby the blade moves to its rest position on removal of the drive current and where the blade operates as a shutter in the stable rest position.

18 Claims, 8 Drawing Sheets

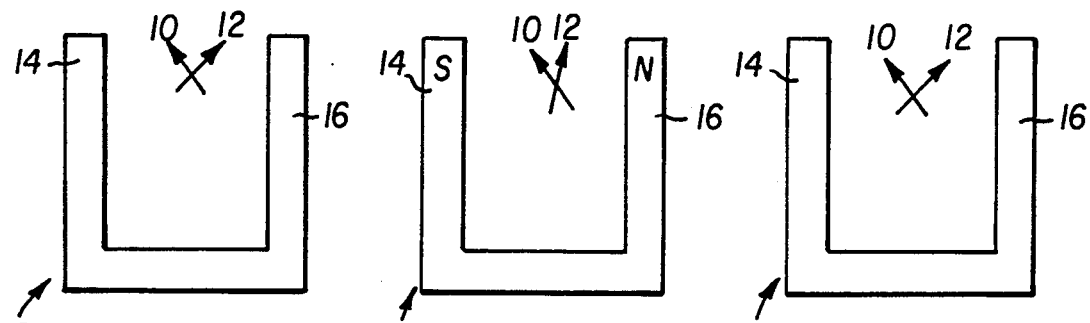
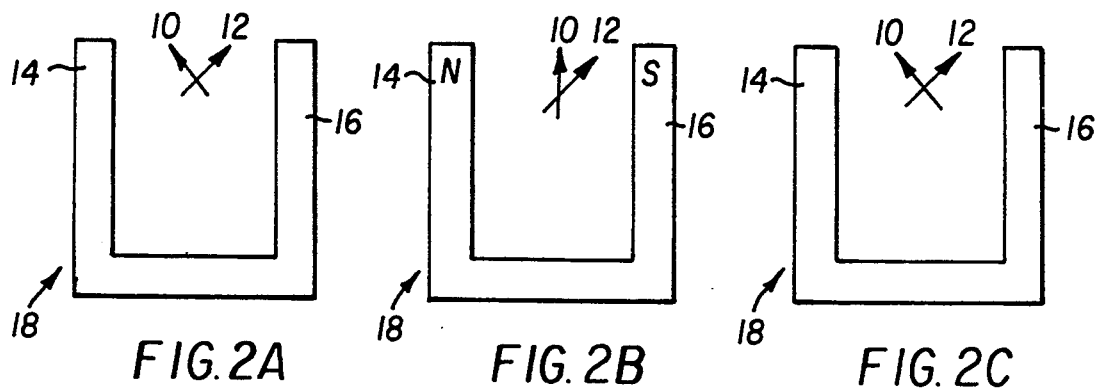
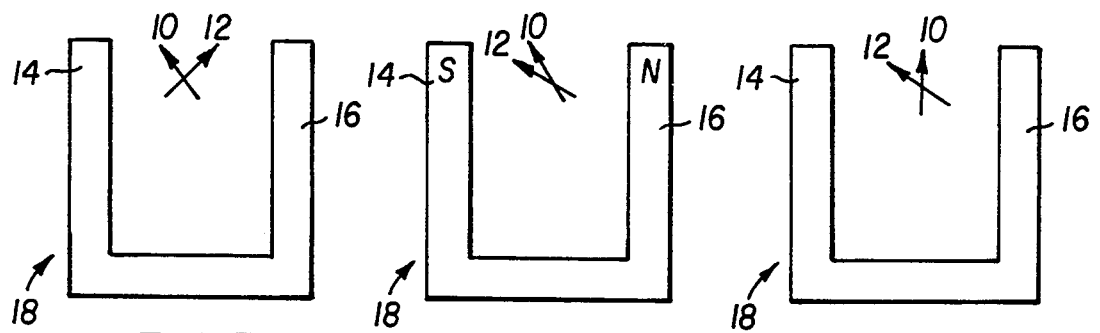
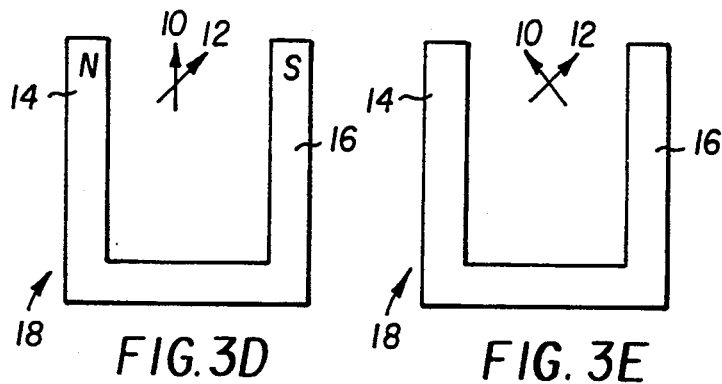

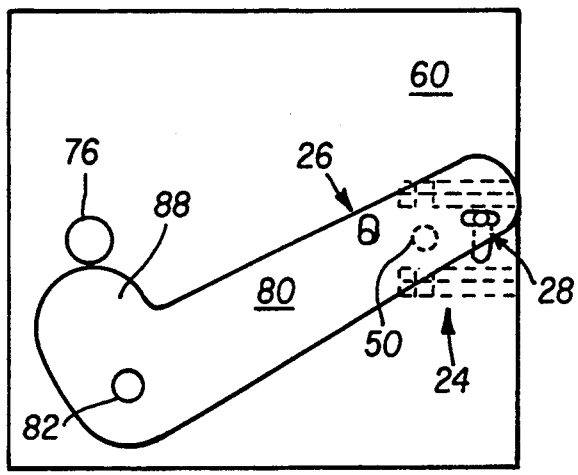
FIG. IIC
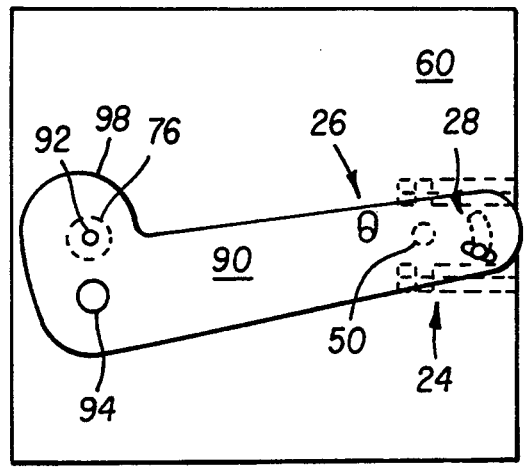
FIG. I2A
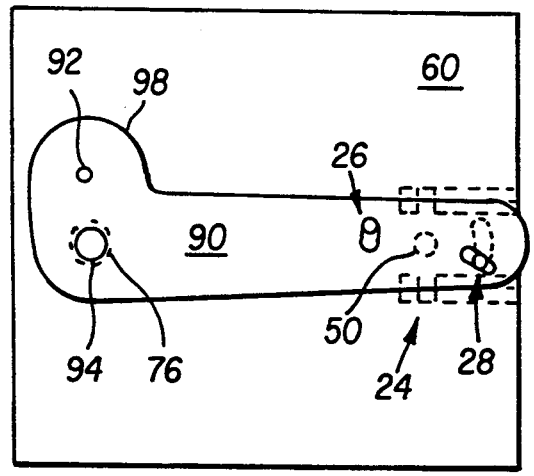
FIG. I2B
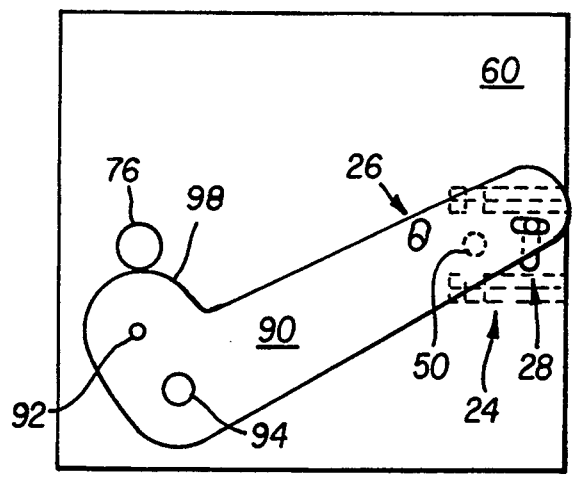
FIG. I2C

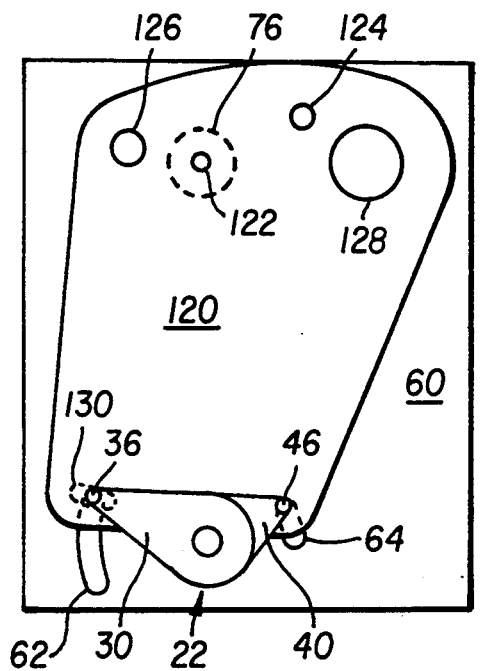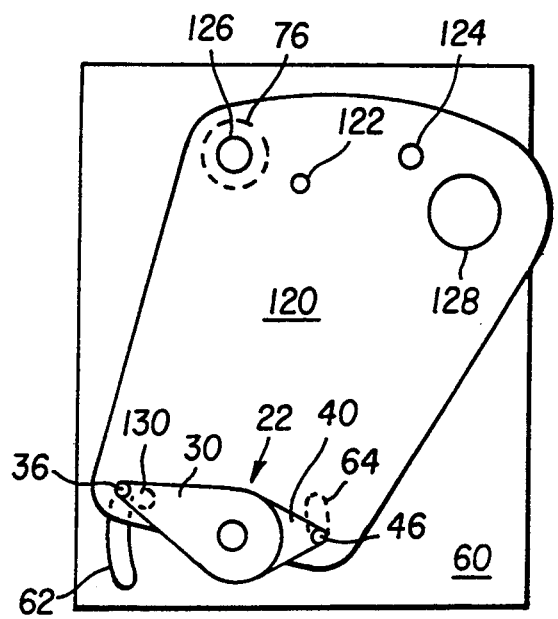
FIG. 15A  FIG. 15B
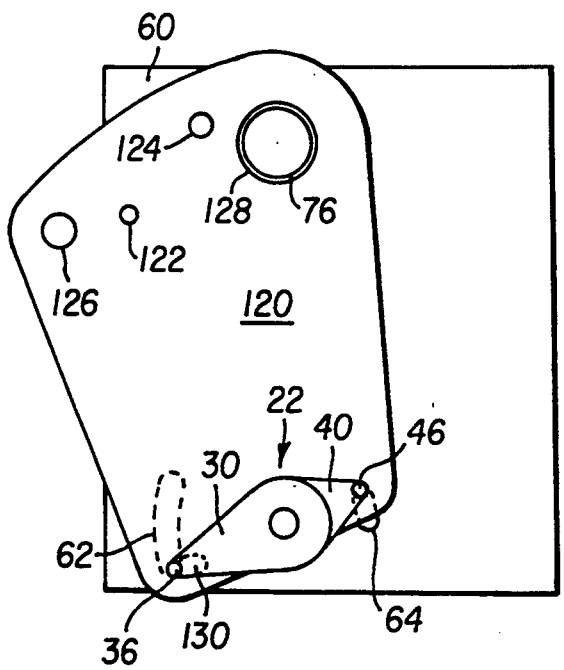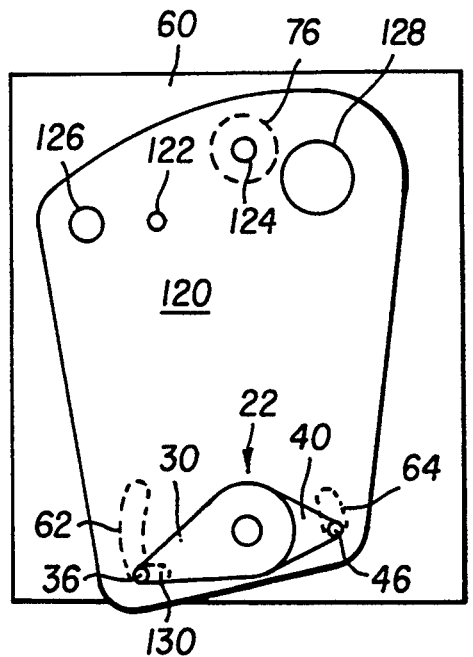
FIG. 15C  FIG. 15D

ELECTROMAGNETIC ACTUATOR

FIELD OF THE INVENTION

This invention pertains to an electromagnetic actuator when used with, but not limited to, a shutter mechanism.

BACKGROUND OF THE INVENTION

A variety of electromagnetic shutter mechanisms are available on the market today that are used for the control of the exposure of photographic film and/or solid state photosensor arrays. Leaf or blade type mechanical shutters have been used to regulate the amount of light allowed to reach the imaging area of the film or photosensor array as a function of the time that the shutter is rendered open (referred to as the "shutter speed"). The shutter opening size or aperture setting in cameras classically has been controlled by an adjustable iris diaphragm or, in less complex cameras, by the position of a further aperture blade having one or more sized apertures formed therein.

Alternatively, the shutter speed and aperture setting functions may be combined in a two blade mechanism (generally collectively referred to as a shutter) that is slidable between a fully closed position and a fully open position, having a number of settable opening positions defining apertures of various sizes, as shown, for example, in U.S. Pat. No. 4,171,897. In a further alternative system, the shutter may have one or more blades that are pivotal about one or more respective axes as shown, for example, in U.S. Pat. Nos. 4,265,530 and 4,658,230 and described in commonly assigned U.S. Pat. No. 5,150,149.

Typically, prior art shutters required the use of a mechanical spring and cocking mechanism set by the user advancing the film and released upon pressing the exposure button. In U.S. Pat. No. 4,671,638, a shuttering device is described that uses flexure springs to close and maintain closure of the shutter blades. Upon application of an electrical current to the coils of the aforementioned shutter, the shutter blades will open to a position determined by the spring force and amount of electric current supplied. Shortcomings of this type of shutter are that an additional component, the spring, is required, and shutter speeds are somewhat slower than if the spring was not incorporated in the design.

Alternatively, with the advent of motorized film advance, prior art shutter mechanisms have more recently utilized magnetic reluctance, or referred to here as a magnetic spring, as part of their function of setting the aperture and speed. See, for example, the above cited '149, '230, '530, and '897 patents and commonly assigned U.S. Pat. Nos. 4,881,093, 5,155,522 and 5,159,382, each incorporated by reference in their entireties, wherein shutter mechanisms are described that do not use mechanical springs to close the shutter blades. Rather, the phenomena of magnetic reluctance is used as a magnetic spring to close the shutter blades when current is removed from an armature coil.

In the above referenced, commonly assigned '149 patent, a single, rotatable permanent magnet is mounted to actuate a shutter blade and a plurality of aperture blades. The magnet rotates in one direction to set the aperture opening and then rotates in the opposite direction to actuate the shutter blade in response to the controlled reversal in polarity of the poles of a stationary electromagnet. A microprocessor based electronic control system provides control signals to energize the electromagnet in a fashion that sets the aperture as a function of a number of discrete pulses and controls the exposure duration or shutter speed. The system is complex, requiring encoding of the number of pulses for setting and resetting the selected aperture.

In the shutter mechanisms and actuators of the '522 and '382 patents, single magnets are mounted on axles to rotate from a stable rest position in relation to an unenergized electromagnet armature to first and second unstable or mono-stable positions under the influence of first and second direction magnetic fields generated by the armature in response to first and second direction currents. In the '522 patent, a shutter blade is directly mounted to the rotating magnet at its axle, and the blade rotates from its stable shuttering position to first and second aperture positions with respect to an imaging lens aperture. In the '382 patent, the single, bar shaped magnet is centrally mounted to an axle for rotation under the influence of the first and second direction magnetic fields, and the blade is pivotally mounted at a second fixed axle. Rotational movement of an end of the bar magnet is transferred to the blade to cause its rotation about its axis to present apertures to the fixed imaging lens aperture.

In the '093 patent, four rotating magnets and armatures are arranged to move four shutter blades in a moving iris arrangement to a desired aperture setting. On application of an electric current to the coils of these shutter blades, the shutter blade or blades open to a full open position, if the duration of the electric current is sufficiently long enough. When the electric current is removed, the shutter blades return to their fully closed position because of the magnetic spring effect. To achieve smaller than full open apertures, the electric current must be turned off or its direction reversed before the shutter blades reach a critical opening point at which the momentum of the shutter blades will carry the blades to their full open position. A shortcoming of this shutter is that discrete apertures are difficult to achieve due to the dynamics of the system.

In these actuators and shutter/aperture blade combinations, the single blade provides the shutter in its stable, rest position when the armature coil is not energized. In the Cameo cameras sold by Eastman Kodak Co., one armature/magnet combination is dedicated for the aperture and is designed to provide two apertures, depending on the direction of current through the armature. Another armature/magnet combination is dedicated to the shutter and is designed to be either in a shutter closed position, in the absence of an energizing current, or moved to a shutter open position in response to an applied current. Only current passing in one direction will open the shutter blade. The benefits of this type of system are that multiple, discrete apertures are achievable for controlled exposure at rapid shutter speeds. The drawback of this type of shutter mechanism is that two armature/magnet combinations are required.

Dual armature, single rotating magnet actuators for a shutter/aperture blade mechanism are also described in Japanese Kokai Patent No. SHO 63[1988]-36228. Simpler, single armature, single rotating magnet actuators are also described in Japanese Kokai Patent No. SHO 63[1988]-36229.

As cameras are miniaturized and camera functions automated under the control of a battery powered electronic control system, compactness and low mass, low power consumption, high range and speed, and precision of the aperture setting of the shutter mechanism become more important. A need exists for a shutter mechanism that satisfies these requirements.

SUMMARY OF THE INVENTION

It is thus an object of the present invention to provide an electromagnetic actuator that, when used in a shutter mechanism, provides fast shutter speeds and discrete apertures, while minimizing the number and mass of armature/magnet combinations.

It is a further object of the invention to provide such a magnetic actuator that achieves low power consumption and is compact.

It is a still further object of the invention to employ magnetic repulsion, as well as magnetic reluctance, for the primary functions of such an electromagnetic actuator.

In accordance with these and other objects, an electromagnetically driven actuator supported by a base plate for controlling an aperture blade having at least one reduced aperture formed therein for regulating the amount of light entering an imaging lens aperture comprises an electromagnetic armature and coil for providing a magnetic field of a first polarity in response to a forward drive current and a magnetic field of a second polarity in response to a reverse drive current, first and second permanent magnets, means for supporting the first and second permanent magnets within the magnetic fields of the electromagnetic armature and coil for allowing rotational movement of the first and second magnets with respect to one another about a common axis, and means for coupling the first and second magnets to the blade for transferring rotational movement of the first and second magnets into pivotal movement of the blade, whereby the blade is movable between at least a rest position when no current is applied to the armature coil and first and second positions when respective forward and reverse drive currents are applied to the armature coil, so that the blade may position at least the reduced aperture over the imaging lens aperture. Preferably the aperture blade has at least first and second apertures and is movable between a stable rest position and first and second unstable positions only during the application of the forward and reverse drive currents to the armature coil.

Moreover, the actuator mechanism further includes first and second means for coupling the first and second magnets to the blade at first and second pivot points, respectively, for transferring rotational movement of the first magnet into pivotal movement of the blade about the second pivot point, whereby the blade is movable between at least the stable rest position when no current is applied to the armature coil to a first aperture position when a respective forward drive current is applied to the armature coil so that the blade may position the first aperture over the imaging lens aperture, and for transferring rotational movement of the second magnet into pivotal movement of the blade about the first pivot point, whereby the blade is movable between at least the rest position when no current is applied to the armature coil to a second aperture position when a respective reverse drive current is applied to the armature coil so that the blade may position the second aperture over the imaging lens aperture.

In the first mono-stable mode of operation, the first and second magnets are limited in the degree to which they can rotate on the common axis through the configuration of the first and second pivot points.

In a second, multi-stable operating mode, the first and second pivot points are configured with respect to the base and aperture blade to allow the first or second magnet to over rotate past the other on application of forward or direct current such that the over rotated magnet rotates to an intermediate stable position on termination of the applied current. Thus, at least four positions of the blade may be selected by the direction of applied current and the sequence of application. In this mode at least one further aperture may be provided in the aperture blade and selected.

In each of the modes of operation, the aperture blade may have apertures in each of the stable and unstable positions and function only as an aperture blade in conjunction with a separately actuated shutter blade for setting exposure time at each of the apertures.

Alternatively, the aperture blade may function as a shutter in the stable rest position so that shutter speed and aperture are controlled by the sequence or direction as well as the duration of the current applied to the armature coil.

The present invention pertains to an electromagnetic actuator that is used in a aperture setting and/or shutter mechanism, but is not limited to that mechanism or use.

The advantages of this invention include effecting discrete apertures and high shutter speeds in a camera with a single pivoting, compact, low mass shutter blade mechanism employing a single electromagnet coil operated at low current drain. The magnetic reluctance of the low mass rotating magnets is advantageously employed by mounting the magnets on a common axis. By the addition of a few inexpensive components, a monostable or multi-stable position actuator has been developed, with little increase in required space and cost for the mechanism.

BRIEF DESCRIPTION OF THE DRAWINGS

Other objects, advantages and features of the present invention will become apparent from the following specification when taken in conjunction with the accompanying drawings in which like elements are commonly enumerated and in which:

FIGS. 1A–1C are schematic, magnetic field representation of two permanent magnets, pivotable on a common axis, one above the other, in their respective positions relative to an armature in positions A–C, wherein there is no current passing through the coil of the armature or a forward current is passing through the armature coil;

FIGS. 2A–2C are schematic, magnetic field representation of two permanent magnets, pivotable on a common axis, one above the other, in their respective positions relative to an armature in positions A–C, wherein there is no current passing through the coil of the armature or a reverse current is passing through the armature coil;

FIGS. 3A–3E are schematic, magnetic field representation of two permanent magnets, pivotable on a common axis, one above the other, in their respective positions relative to an armature in positions A–E providing a bi-stable mode of operation;

FIGS. 11A-11C illustrate in a bottom view the mono-stable mode motion of the aperture/shutter blade between a rest, closed aperture position A, a lower aperture position B and a full aperture position C;

FIGS. 12A-12C illustrate in a bottom view the mono-stable mode motion of a two aperture blade between a rest, small aperture position A, a medium aperture position B and a full aperture position C;

FIGS. 15A-15D illustrate in a top view the hi-stable mode motion of an aperture blade between a rest, position A, and alternate aperture positions B-D conforming with the bi-stable magnet mode operation depicted in FIG. 3.

Figure 4:
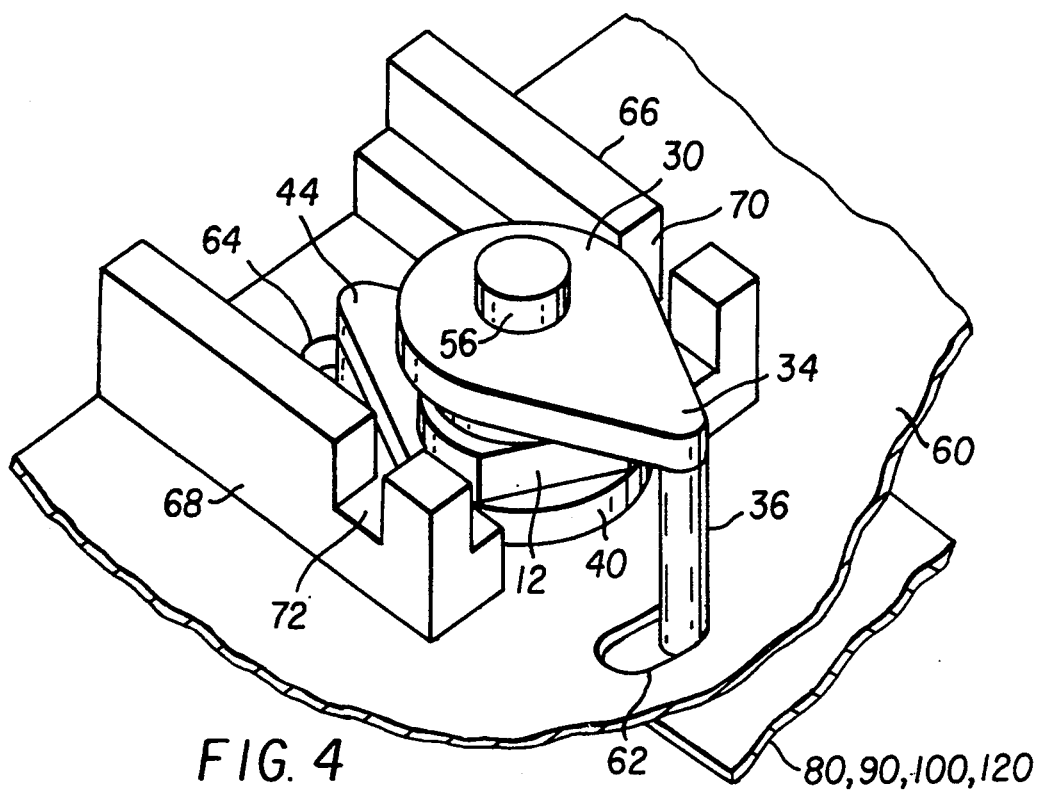
FIG. 4 is an isometric view of the dual rotating magnet actuator with the armature assembly removed.

The drawings are not necessarily to scale.

DETAILED DESCRIPTION OF THE PREFERRED EMBODIMENTS OF THE INVENTION

The invention utilizes the like pole repulsion of permanent magnets, the attraction of the permanent magnets to a ferrous material, and the attraction to and/or repulsion of a magnet to an electromagnet in mono-stable and bi-stable operating modes and with a single, combined aperture/shutter blade or with separate aperture defining and shutter speed blades. The preferred embodiments of the invention place a pair of two pole magnets mounted to rotate on the same axis and arranged in close proximity to one another. The magnets are oriented in such a way as to have like poles close to each other, so that they will normally repel each other. The magnets are mounted on a common shaft that, in the absence of magnetic force, allows free rotation of the magnets about the shaft and allows rotation under magnetic attraction and repulsion.

The free rotation of each magnet is limited by a shoe that is assembled to the magnet and has a pin which rides in a slot in the base and a further slot or hole in one end of a pivotal shutter blade positioned below the base. Each magnet is affixed to its respective shoe with an orientation with respect to its respective pin in the slots, such that when both magnet assemblies are placed onto the shaft, they will repel each other and rotate in opposite directions as far as the respective pins in the slot will allow. This behavior will take place without a magnetic field generated by tha electromagnet armature. The rotation of the magnets under the influence of magnetic fields produced by energization of the armature effects pivotal movement of the aperture or aperture/shutter blade coupled to each magnet by the respective pin-in-slot mechanism.

When an armature is placed in proximity to the coaxially mounted permanent magnets, the poles of the magnets will be attracted by simple proximity to the ferrous armature arms which further produces a rotational torque on the magnets. The magnets are restricted from further rotation toward the armature arms by the same pin-in-slot features described above.

When a forward electrical current is passed through the coil of the armature, one arm of the armature will become a North pole, while the other arm will become a South pole. When this happens, the magnet with its North pole closest to the armature's South pole will be further attracted to rotate, but will again restricted by the respective pin-in-slot arrangement. However, the other magnet which has its North pole closest to the North pole of the armature will be repelled by the armature's North pole and will rotate towards the South pole of the armature, effecting movement of its respective pin. Only a limited rotation is allowed, so that when power is removed from the armature, the magnet that rotated will be repelled by the other magnet and will counter-rotate to its home position. By reversing the current going to the armature coil, the magnet which previously did not move will now rotate and move its respective pin in the associated slots. Thus, a sequence of movements of the magnets and their associated pins may be effected to pivotally move the associated shutter blade. The movement of the pins in the slots translates into pivotal movement of the associated aperture or aperture/shutter blade between a rest, fully closed shutter or starting aperture defining position to a selected aperture defining position and back to the rest position.

In reference now to FIGS. 1 and 2, the mono-stable mode or behavior is illustrated schematically. In positions A of FIGS. 1 and 2, the magnetic poles of the first and second permanent magnets 10 and 12, which are illustrated as dark and light arrows, respectively, are repelled from one another and toward the arms 14 and 16 of C-shaped ferrous armature 18 in the absence of a current flowing through the turns of the electromagnet coil (not shown) wrapped around the base of the armature 18. In this position, an associated aperture or aperture/shutter blade (neither shown) would be positioned in its normal, rest position.

In position B of FIG. 1, a direct current is applied in a first or forward direction to the electromagnet coil to induce the magnetic South and North poles in the respective arms 14 and 16. The South pole of arm 14 attracts the North magnetic pole of magnet 10, but the pin-in-slot arrangement (not shown) inhibits further rotation of magnet 10. At the same time, the North pole of magnet 12 is repelled by the North pole in arm 16 and rotates counter-clockwise as far as it is able to do so by its associated pin-in-slot arrangement. This rotation is employed to move the associated blade (not shown) to a second, exposure position, as long as the current is applied.

In position B of FIG. 2, a direct current is applied in a second or reverse direction to the electromagnet coil to induce the magnetic South and North poles in the respective arms 16 and 14. The South pole of arm 16 attracts the North magnetic pole of magnet 12, but the pin-in-slot arrangement (not shown) limits further rotation of magnet 12. At the same time, the North pole of magnet 10 is repelled by the North pole in arm 14 and rotates counter-clockwise as far as it is able to do so by the limit imposed by its associated pin-in-slot arrangement. This rotation may be employed to move the associated blade (not shown) to a second aperture setting position, as long as the current is applied. When the reverse current is terminated, the magnet 10 rotates back to its starting or normal position as shown at position C in FIG. 2. Thus, by combining forward and reverse current control in the same aperture setting mechanism, at least two aperture settings may be selected for a simple camera application and three aperture settings are possible with a separate shutter blade and shutter actuator.

A first application of the mono-stable mode of operation involves the control of an aperture/shutter blade having a first blade portion for obstructing the passage of light, i.e. acting as a shutter when positioned over the fixed, maximum lens opening camera aperture, and a second portion having a reduced size aperture. When no current is provided to the armature coil, the blade completely covers the maximum lens aperture. When forward current is applied to the armature coil, the blade swings in one direction placing a smaller aperture in front of the maximum lens aperture (see FIG. 12, position B). With reverse current applied to the armature coil, the blade will swing in the opposite direction and expose the maximum lens aperture (see FIG. 12, position A).

In a second application of the mono-stable mode, the blade is modified to become strictly an aperture blade. The operation of this aperture blade is the same as the aperture/shutter blade described immediately above, except that without power to the armature coil, an additional aperture hole in a further portion of the blade is positionable over the maximum lens aperture. This arrangement requires an additional shutter mechanism to separately close the imaging lens aperture.

A multi-stable embodiment of the invention utilizes a similar action as described above, except that the magnets 10 and 12 are allowed to rotate between more than one rest position, providing an additional aperture defining position of the aperture or aperture/shutter blade. Turning now to FIG. 3, it schematically illustrates a bi-stable mode of operation in positions A through E of the two aligned magnets.

In position A, no current is applied to the armature coil, and the blade is in its rest position. When a forward current is passed through the armature coil, the second magnet 12 with its North pole closest to the North pole induced in arm 16, will be allowed to over-rotate in a counter-clockwise direction as shown at position B of FIG. 3. The North pole of magnet 12 will pass by the North pole of the first magnet 10 before the second magnet 12 reaches its stopping point which is closer to the South pole in arm 14. The stopping point is defined by the freedom of movement of the associated pin in the slots of the base and the associated shutter blade. The North pole in arm 16 repels the North pole of magnet 10 and overcomes the mutual repulsion that would normally rotate the first and second magnets 10 and 12 as far apart as possible.

In this case, when the forward current is removed from the coil, the first magnet 10, which did not move previously, will now rotate clockwise away from the second magnet 12, as shown in position C of FIG. 3, due to mutual repulsion of the adjacent North poles of the two magnets. The clockwise rotation is allowed by and continues until magnet 10 reaches its stopping point determined by its respective pin-in-slot configuration. Thus, after application of and termination of the forward current, the magnets are re-positioned to a further rest position which may be employed to define a further stable aperture position.

Upon application of a reverse current through the armature coil, the North and South poles of the arms are reversed as shown in position D of FIG. 3. Assuming that the magnets 10 and 12 were previously in the bi-stable position C, the second magnet 12 responds by over-rotating clockwise by magnetic repulsion allowing the North pole of the second magnet 12 to pass by the North pole of the first magnet 10.

Position D is maintained as long as the reverse current is maintained. When the reverse current is again removed, the first magnet 10 will rotate counter-clockwise away from the second magnet 12 and into the starting rest position E (which corresponds to position A).

This over-rotation of the first and second magnet poles between two stable rest positions A and C in the absence of a current thus allows a bi-stable mode of operation which may be employed to define a further aperture defining blade position.

The reverse current may also be directly applied from the rest position A, resulting in rotational movement of magnet 10 directly to position D. Position D is maintained as long as current is applied. Position E (or A) is resumed upon release of the reverse applied current.

Figure 5:
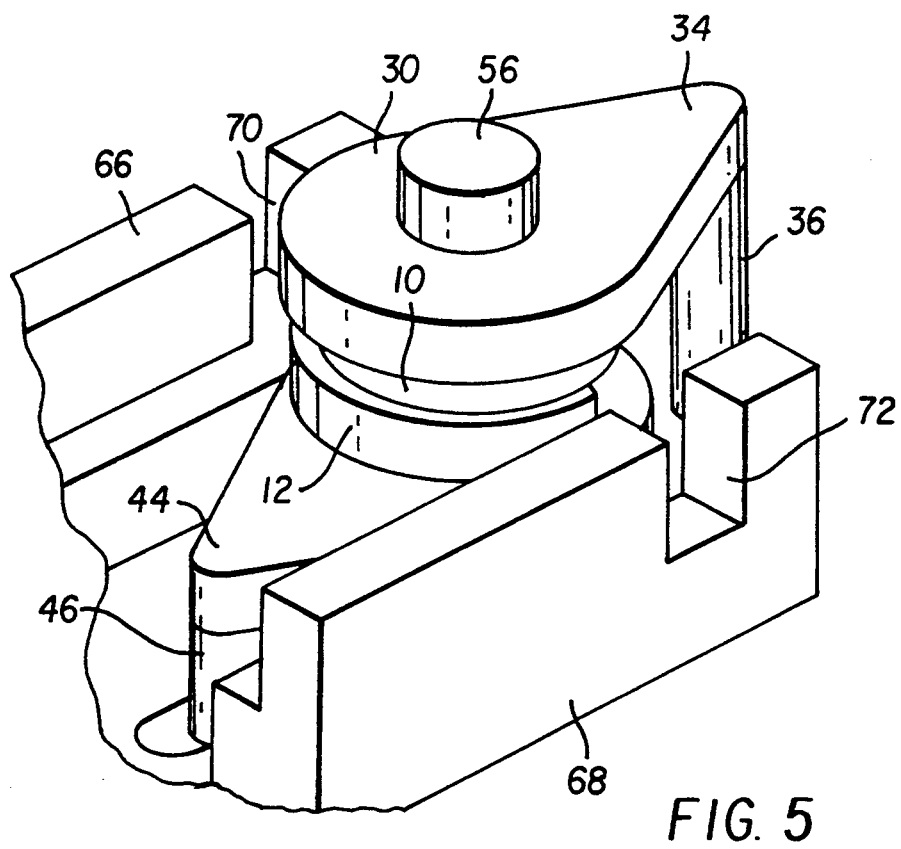
FIG. 5 is an isometric view of the dual rotating magnet actuator from a different angle, also with the armature assembly removed.
Figure 6:
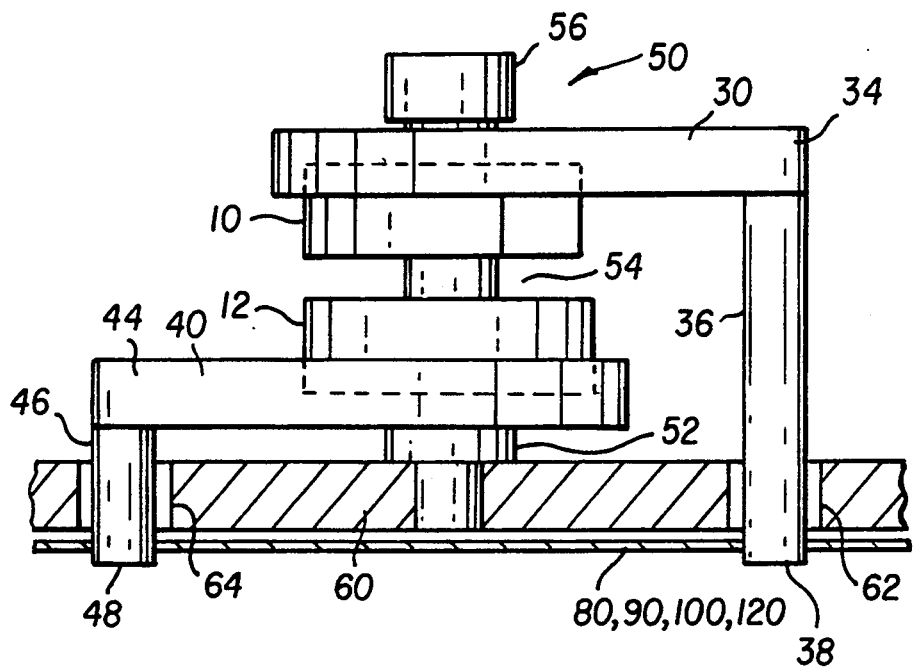
FIG. 6 is a side view of the actuator with the base, lower and upper magnet assemblies showing.
Figure 7:
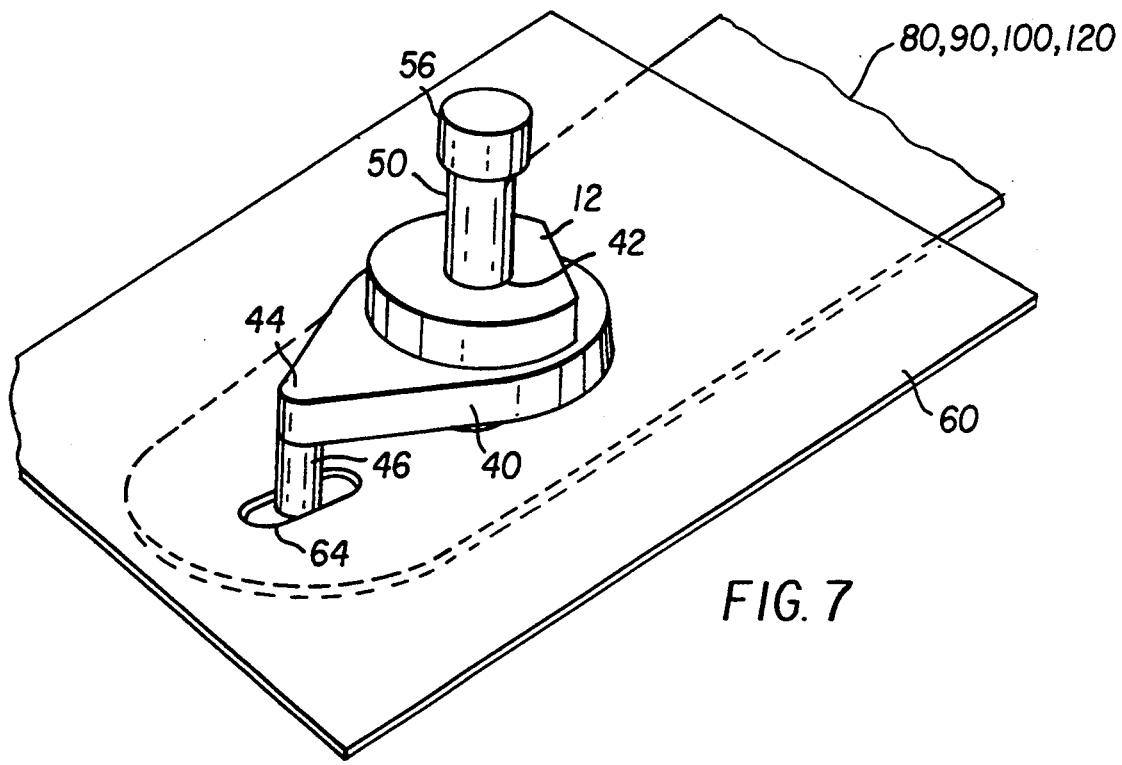
FIG. 7 is an isometric view of the actuator with only the base and lower magnet assembly showing.
Figure 8:
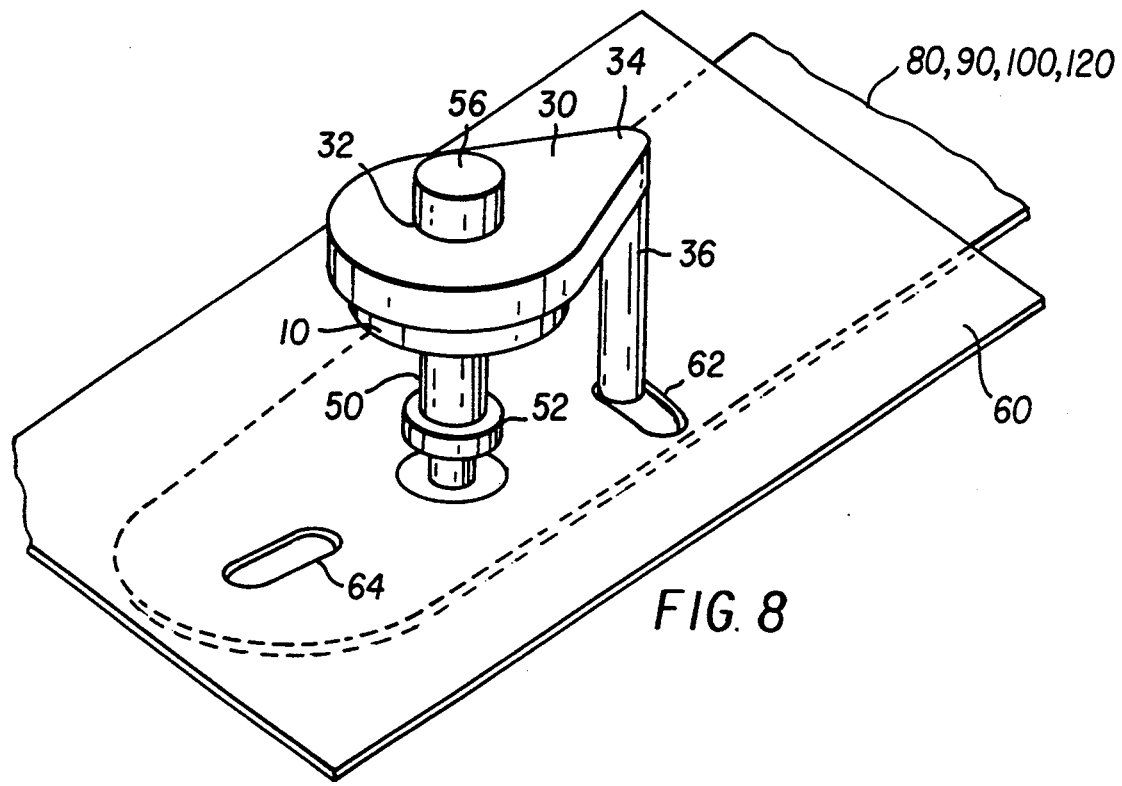
FIG. 8 is an isometric view of the actuator with only the base and upper magnet assembly showing.

Turning now to the construction and arrangement of the dual rotatable magnet actuator 22 in a first embodiment operable in the mono-stable mode (modifiable to the multi-stable mode as described below with reference to FIG. 15), FIG. 4 and 5 are different isometric views of the dual magnet actuator with the armature assembly removed, FIG. 6 is a side elevation view of the dual magnet actuator and FIGS. 7 and 8 are further isometric views of the lower and upper magnets and their associated shoes and pins in relation to slots in a blade.

The upper and lower magnets depicted in FIGS. 4–8 correspond to the first and second magnets 10 and 12 and are generally disc shaped having flats formed thereon for convenience of indicating the orientation of the North and South poles. For example, in any given embodiment, the North or South poles of each magnet 10, 12 would be centered on the flats depicted.

Magnets 10 and 12 are attached to the respective shoes 30 and 40 so that the shoes 30 and 40 may rotate with the magnets 10 and 12 about the vertical shaft 50. Each attached magnet and shoe is supported by the shaft 50, and freely rotate about the shaft within ranges dictated by the pin-in-slot coupling arrangements 26 and 28 depicted in the Figures under the influence of the magnetic attraction and repulsion between one another and the poles of the armature 20.

Referring specifically to FIG. 6, the stationary shaft 50 extends from the base plate 60 and supports the lower magnet 12 and shoe 40 at a first distance above base plate 60 and the upper magnet 10 and shoe 30 at a second distance above the base plate 60. Each of the assembled magnets and shoes have aligned bores 32 and 42 that receive the shaft 50 with enough play to allow rotation with respect to the shaft 50. The support of the lower magnet and shoe is provided by an annular support ring 52 attached to shaft 50 that is greater in diameter than the bore extending through the lower magnet 12 and shoe 40. The positioning of the bore 42 of the lower magnet 12 and shoe 40 on shaft 50 is also depicted in FIG. 7.

The support for the upper magnet 10 and shoe 30 is effected by the repulsion of the mutually overlapping magnetic fields of the magnets 10 and 12. The magnets 10 and 12 repel one another and tend to slide apart on the shaft 50, forming the space 54. The upper magnet 10 is retained on the shaft 50 by the cap 56. The lower magnet 12 is retained by the ring 52. The magnets 10 and 12 are therefore retained and each influenced by the magnetic field of the other to rotate their matching poles away from one another on the shaft 50.

The shoes 30 and 40 are attached at ends 34 and 44, respectively, to downwardly extending pins 36 and 46 which extend into slots 62 and 64 of base plate 60, respectively, as shown in FIGS. 6–8. Thus, during assembly, the lower magnet 12, shoe 40 and pin 46 are slipped over the shaft 50, so that the pin 46 extends into slot 64 and the lower surface of the magnet 12 rests on and is repelled by the field of magnet 10 against ring 52. Then the magnet 10, shoe 30 and pin 36 are slipped, through bore 32, onto the shaft 50, so that the pin 36 extends into the hole or slot 62. A retaining cap 56 is attached to the end of shaft 50 to retain the upper magnet 10 and shoe 30 in place.

As shown in FIG. 6, the free ends 38 and 48 of the pins 36 and 46, respectively, also extend through slots or pin holes of the shutter/aperture blades 80, 90, 100, or 120 in a manner to be described below. Rotational movement of one or the other of the magnets 10 and 12 in the current energized armature produced magnetic fields effects pivotal movement of the attached shutter-/aperture blade on one of the two pins 36 or 46 as the other pin is being moved by rotation of its associated magnet and shoe in a manner described below. The slots 62, 64 in the plate or base 60 limit the freedom of movement and position the poles of the magnets in the various positions shown, for example in FIGS. 1–3.

Figure 9:
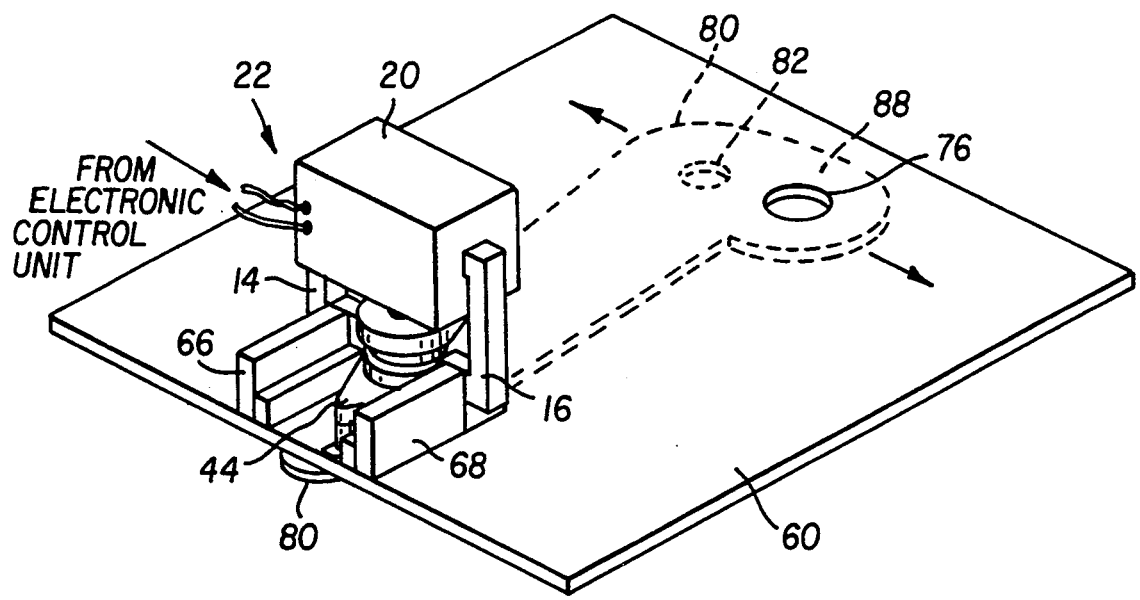
FIG. 9 is an isometric view showing the base, both magnet assemblies, the armature and a shutter blade of a first embodiment of the invention.

As shown in FIGS. 4 and 5, the shaft 50 and slots 62, 64 are positioned between a pair of retainer blocks 66 and 68 attached in parallel to one another on the base plate 60. The blocks 66 and 68 are formed with gaps 70 and 72, respectively, into which the armature arms 14 and 16 may be received and attached (as depicted in FIG. 9). The electromagnet 18 is completed by the armature coil 20 formed around the center of the C-shaped core and positioned above the shaft 50. Thus the electromagnetic field between the North and South poles of the arms 14 and 16 (or 16 and 14 depending on current direction) extends across the permanent magnets 10 and 12 in the manner described above with reference to FIGS. 1–3.

Referring now to FIGS. 9–12, mono-stable embodiments of the actuator assembly 22 of the invention are depicted with an aperture/shutter blade 80 or an aperture only blade 90. In FIG. 9, the flat aperture/shutter blade 80 is positioned below and parallel with the lower surface of the base plate 60 which is arbitrarily depicted as rectangular. For purposes of easing understanding of the assembly, the elongated, flat blade 80 is depicted in FIG. 9 in dotted lines, although it is largely hidden from view beneath the opaque base plate 60. The aperture/shutter blade 80 extends away from the pivotal points of attachment or insertion with the respective pins 36 and 46 and pivots counter-clockwise to fully expose the full imaging lens aperture 76 formed in base plate 60 and clockwise to position reduced aperture 82 of blade 80 in alignment with full lens aperture 76.

The clockwise and counter-clockwise pivotal movements are effected by the application of forward and reverse current (for example) through the armature coil 20 to effect rotation of the first and second magnets in the manner described above with reference to FIGS. 1 and 2. The limitation of motion is governed by the pin-in-slot coupling arrangements 26 and 28 of the pins 36 and 46 and the respective slots 62 and 64 in base plate 60 and the matching hole 84 and slot 86, respectively, in aperture/shutter blade 80, as shown in greater detail in the top view of FIG. 10.

Figure 10:
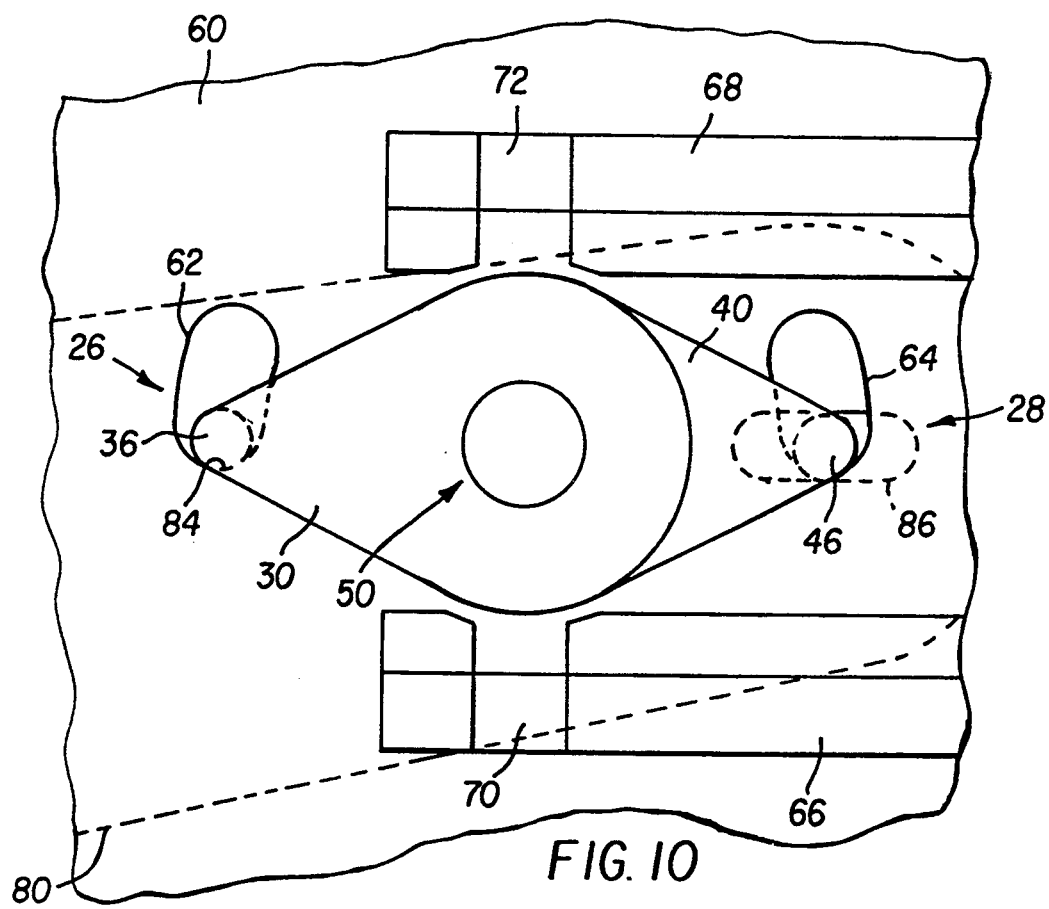
FIG. 10 is a top, close-up schematic view of one embodiment of the actuator of the present invention for providing the mono-stable mode of operation.
Figure 11A:
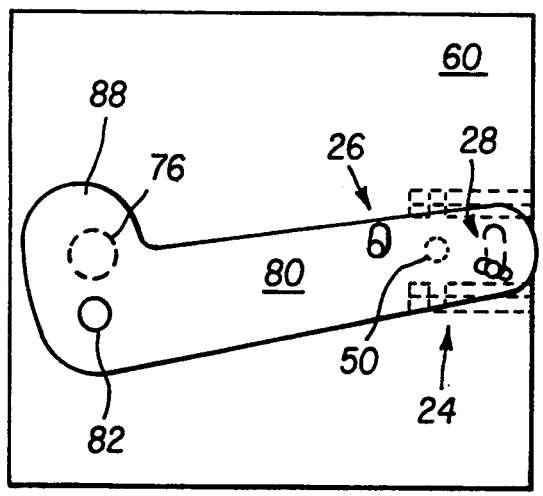
Figure 11B:
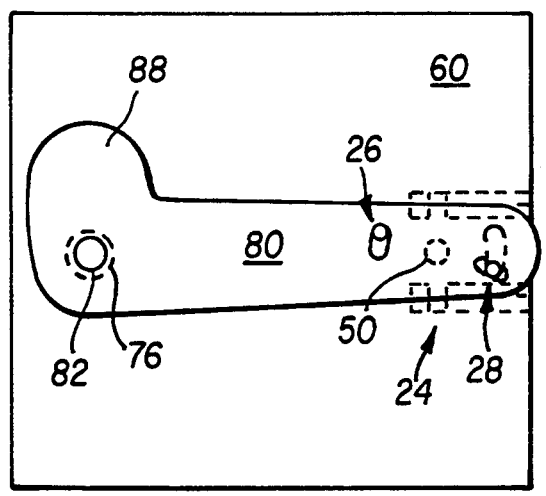

Turning to FIG. 11, it illustrates from a bottom view the movement of the aperture/shutter blade 80 of FIG. 9 between the rest, fully closed aperture, position A and the reduced aperture position B or the full aperture position C in response to forward or reverse current applied to the armature coil 20. In FIG. 11, the footprint 24 of the actuator assembly 22 depicted in FIGS. 9 and 10 is represented, including the pivotal movement of the blade 80 about the shaft 50 under control of the first and second pin-in-slot coupling mechanisms 26 and 28 described above in detail.

In the rest position A of FIG. 11, the base plate aperture 76 is covered by the opaque, club-shaped portion 88 of the aperture/shutter blade 80. In position B, the blade 80 is rotated clockwise to position the reduced size aperture 82 in line with the full lens aperture 76 for the period of time that an automatic exposure control system (not shown) dictates to make an exposure of the underlying film or sensor array. In position C, the blade 80 is rotated counter-clockwise to expose the full size aperture 76 again for the period of time that an automatic exposure control system (not shown) dictates to make an exposure. As described above, the blade is pivoted into the positions B and C by forward and reverse current in the manner described above with reference to FIGS. 1 and 2.

FIG. 12 depicts a further mono-stable aperture assembly employing an aperture defining blade 90 that does not operate as a shutter and is intended to be used with a separate shutter. Again, the bottom view of the blade 90 the footprint 24 and the base plate 60 is depicted in three aperture defining positions. Blade 90 has small and intermediate apertures 92 and 94 formed in the club-shaped end 88 thereof.

In the rest position A of FIG. 12, the base plate aperture 76 is exposed by the small aperture 92 aperture blade 90. In position B, the blade 90 is rotated clockwise to position the intermediate size aperture 94 in line with the imaging lens aperture 76. In position C, the blade 90 is alternatively rotated counter-clockwise to completely expose the full size imaging lens aperture 76. As described above, the blade 90 is pivoted into the positions B and C by forward and reverse current in the manner described above with reference to FIGS. 1 and 2.

In this embodiment, the aperture defining actuator is employed with a further shutter that is normally closed to block light passing through aperture 76 and opened in conjunction with the operation of the aperture setting actuator to define the exposure times at the selected aperture. The aperture blade 90 may be pivoted to the above described aperture positions B and C prior to and following operation of the shutter actuator for the period of time that an automatic exposure control system (not shown) dictates, to make an exposure of the underlying film or sensor array through the imaging lens 76.

Figure 13:
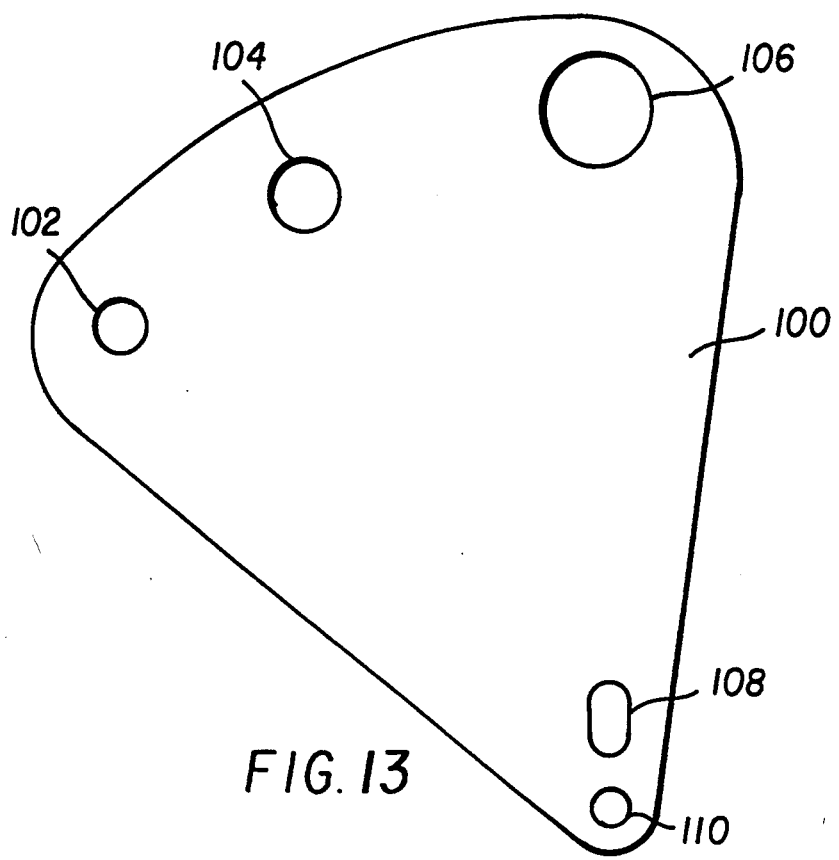
FIG. 13 shows a print of a three-aperture blade which may be used with the actuator operable in the mono-stable mode of operation.
Figure 14:
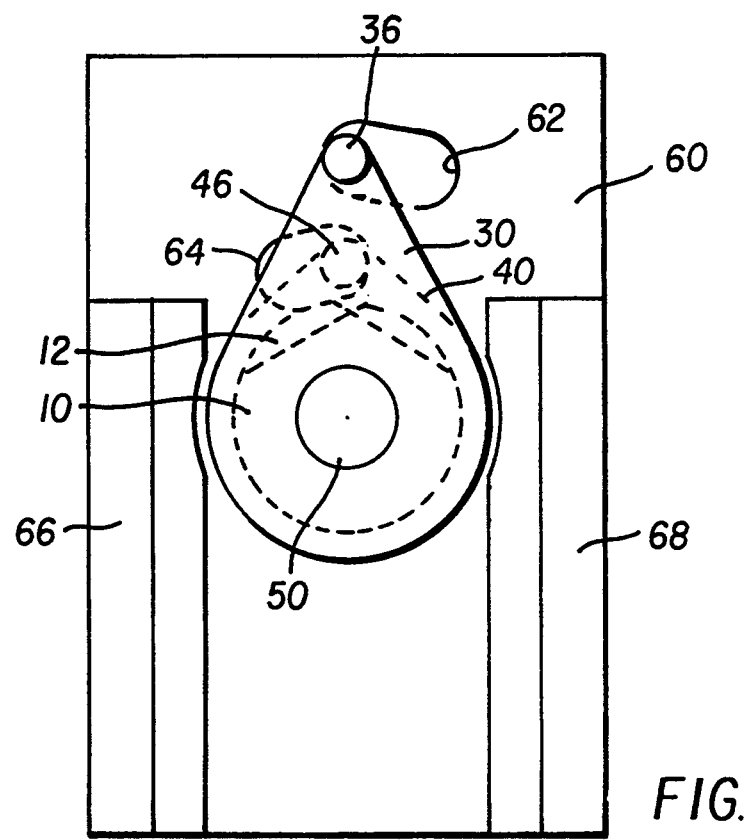
FIG. 14 shows an armature configuration operating the blade of FIG. 13.

Turning now to FIG. 13 it depicts a further three aperture blade 100 having small, intermediate and large apertures 102, 104 and 106 and a slot 108 and pivot hole 110 that may be attached to an actuator of the type shown in FIG. 14. The actuator depicted in FIG. 14 has the shoes 30 and 40 mounted to the magnets 10 and 12 positioned on the shaft 50 so that the pins 36 and 46 extend in the same direction through respective slots 62 and 64 in the base plate 60 and into the slot 108 and pivot hole 110 in the aperture blade 100.

One possible implementation of an actuator mechanism and further aperture blade 120 in the multi-stable mode of operation is depicted in the positions A–D of FIG. 15. Positions A–D differ from but are similar to the magnet orientation positions A–D of FIG. 3. In each position, the actuator is constructed as generally depicted in FIGS. 4–10, but is oriented differently with respect to the differently shaped aperture blade 120, and the components of the armature as well as the base plate 60 are not entirely depicted for simplicity. The aperture blade 120 has small, first intermediate, second intermediate, and large apertures 122, 124, 126, and 128, respectively, that may be attached to an actuator of the type shown in FIG. 10. The actuator depicted in FIG. 10 has the shoes 30 and 40 mounted to the magnets 10 and 12 positioned on the shaft 50 so that the pins 36 and 46 extend in the same direction through respective slots 62 and 64 in the base plate 60 and into the slot 130 and pivot hole 132 in the aperture blade 120 in the same fashion as depicted in FIG. 6.

The unpowered stable rest position is depicted in position A, and the magnets 10 and 12 of the actuator assembly 22 repel each other as depicted in position A of FIG. 3. The respective pin-in-slot limits of the pins 36 and 46 in ends of slots 62 and 64 depicted in position A prevent movement of the shutter or base plate aperture 122 from alignment with the shutter aperture 140. In this case, the smallest aperture 140 is aligned with the base plate aperture 122. Alternatively, the aperture blade 120 may be configured without aperture 122 and operate as a shutter blade by movement out of and back into position A.

Current applied in a first direction to the armature coil generates a forward magnetic field that effects rotation of moving magnet 12 and shoe 40 of the actuator assembly to position B. Responsive rotation of the moving magnet 12 is limited by the engagement of the pin 46 in the other end of fixed slot 64, and the pole of magnet 12 does not rotate past the like pole of stationary magnet 10. This position B is therefore not stable, and removal of the current returns the actuator assembly 22 and aperture blade 120 back to position A, as magnet 12 rotates and shoe 40 pivots back counter-clockwise.

Current applied in the opposite direction to the armature induces a reverse magnetic field that causes rotation of first magnet 10 and associated shoe 30 and pin 36 in the aligned slots 62 and 130 from position A to position C. In this case, the pole of rotated magnet 10 passes the like pole of stationary magnet 12, and position C is stable only so long as the current is applied. Thus, as depicted, blade aperture 128 is aligned with base aperture 76 until current is removed.

Upon removal of the reverse current and reverse magnetic field, the magnet 12 and shoe 40 move clockwise as the magnet poles repel one another. Pin 46 moves in slot 64 to the other end thereof to pivot blade 120 on the pin 36. Aperture 124 is thereby moved into alignment with imaging lens aperture 76 when the current is removed as depicted in position D. Position D is stable, and the removal of the current causes the actuator assembly 22 and blade 120 to remain in that position.

In order to return to position A, current is again applied in the forward direction to generate the forward magnetic field which causes magnet 10 and shoe 30 to rotate clockwise in slot 62 to pivot blade 120 on pin 46 to position B. Upon removal of the current, actuator 22 and blade 120 pivot back to position A as magnet 12 and shoe 40 rotate counter-clockwise. In this fashion, the bi-stable mode of operation described with reference to FIG. 3 may be achieved. It should be noted that the sequence of operation of FIG. 15 is different from that of FIG. 3, thus providing a further example of the multi-stable mode of operation possible following the teachings of the invention.

The forward and reverse currents for application to the coil of the armature in the various embodiments described above may be provided by the circuit of FIG. 7 of the '149 patent, incorporated herein by reference in its entirety, or other like circuits and may be applied in any desired sequence and time periods to position the desired aperture for the requisite exposure time.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

| PARTS LIST |
| --- |
| first or upper permanent magnet 10 |
| second or lower permanent magnet 12 |
| armature arm 14 and 16 |
| ferrous armature 18 |
| armature coil 20 |
| actuator assembly 22 |
| actuator footprint 24 |
| pin-in-slot coupling arrangements 26 and 28 |
| shoe 30 |
| bore 32 |
| shoe end 34 |
| downwardly extending pin 36 |
| pin free end 38 |
| shoe 40 |
| bore 42 |
| shoe end 44 |
| downwardly extending pin 46 |
| pin free end 48 |
| upwardly extending shaft 50 |
| support ring 52 |
| space 54 |
| retaining cap 56 |
| base plate 60 |
| base plate slot 62 |
| base plate slot 64 |
| retainer blocks 66 and 68 |
| gaps 70 and 72 |
| full imaging lens aperture 76 |
| aperture/shutter blade 80 |
| reduced aperture 82 |
| matching hole 84 and slot 86 |
| club-shaped portion 88 |
| aperture defining blade 90 |
| small aperture 92 |
| intermediate aperture 94 |
| three aperture blade 100 |
| small aperture 102 |
| intermediate aperture 104 |
| large aperture 106 |
| slot 108 |
| pivot hole 110 |
| four aperture blade 120 |
| small aperture 122 |
| first intermediate aperture 124 |
| second intermediate aperture 126 |
| large aperture 128 |
| slot 130 |

-continued

| PARTS LIST |
| --- |
| pivot hole 132 |

What is claimed is:

1. An electromagnetically driven actuator supported by a base plate for controlling an aperture blade having at least first and second apertures formed therein for regulating the amount of light entering an imaging lens aperture comprising:

an electromagnetic armature and coil for providing a magnetic field of a forward polarity in response to a forward drive current and a magnetic field of a reverse polarity in response to a reverse drive current;

first and second permanent magnets;

means for supporting said first and second permanent magnets within the influence of their magnetic fields and the forward and reverse magnetic fields and for allowing rotational movement of said first and second magnets about a common axis under the collective influence of said magnetic fields; and means for coupling said first and second magnets to said blade to position said blade in a stable rest position in the absence of a forward or reverse magnetic field and for transferring rotational movement of said first and second magnets into movement of said blade between said stable rest position when no current is applied to said armature coil to a first aperture position when a forward drive current is applied to said armature coil, so that said blade may position said first aperture over said imaging lens aperture, and to a second aperture position when a reverse drive current is applied to said armature coil, so that said blade may position said second aperture over said imaging lens aperture.

2. The actuator of claim 1 wherein said coupling means further comprises:

first means for coupling said first magnet to said blade for transferring rotational movement of said first magnet into pivotal movement of said blade, whereby said blade is movable between at least a rest position when no current is applied to said armature coil to a first position when a respective forward drive current is applied to said armature coil, so that said blade may position said first aperture over said imaging lens aperture; and second means for coupling said second magnet to said blade for transferring rotational movement of said second magnet into pivotal movement of said blade, whereby said blade is movable between at least said rest position when no current is applied to said armature coil to a second position when a respective reverse drive current is applied to said armature coil, so that said blade may position said second aperture over said imaging lens aperture.

3. The actuator of claim 2 wherein said supporting means further comprises:

axle means for supporting said first and second magnets in proximity to one another such that the respective magnetic poles of said first and second magnets influence each other and for allowing free rotational movement thereof with respect to one another under the influence of magnetic attracting forces of opposite magnetic polarity and magnetic repelling forces of like magnetic polarity of the mutually influencing magnetic fields thereof and under the influence of forward and reverse magnetic fields produced by said armature coil in response to said forward and reverse currents.

4. The actuator of claim 3 wherein:

said first coupling means further comprises:

first pivotal attaching means for pivotally attaching said first magnet to said first pivot point of said aperture blade for applying pivotal movement force to said aperture blade in response to rotational movement of said first magnet; and first limiting means for limiting rotational movement of said first magnet and pivotal movement of said first pivotal attaching means so that rotation of a pole of said first magnet in response to said forward magnetic field is toward the like pole of the second magnet; and said second coupling means further comprises:

second pivotal attaching means for pivotally attaching said second magnet to a second pivot point of said aperture blade for applying pivotal movement force to said aperture blade in response to rotational movement of said second magnet; and second limiting means for limiting rotational movement of said second magnet and pivotal movement of said second pivotal attaching means so that rotation of a pole of said second magnet in response to said reverse magnetic field is toward the like pole of said first magnet.

5. The actuator of claim 4 wherein said first and second limiting means further comprise:

means for limiting rotational movement of the like poles of said first and second magnets away from one another in said stable rest position, wherein the like poles of the first and second magnets are in opposition to one another in the absence of forward and reverse current induced magnetic fields;

means for limiting rotational movement of the like poles of said first and second magnets toward one another in response to the forward and reverse magnetic fields, respectively, so that the like poles of said first and second magnets repel each other and rotate the like poles of said first and second magnets away from one another upon termination of the forward and reverse magnetic fields and thereby return said aperture blade to said stable rest position.

6. The actuator of claim 5 wherein:

said aperture blade is provided with a third aperture for regulating the amount of light entering an imaging lens aperture when said aperture blade is in said stable rest position.

7. The actuator of claim 3 wherein:

said aperture blade is provided with a third aperture for regulating the amount of light entering an imaging lens aperture;

said first coupling means further comprises: first pivotal attaching means for pivotally attaching said first magnet to said first pivot point of said aperture blade for applying pivotal movement force to said aperture blade in response to rotational movement of said first magnet; and first limiting means for limiting rotational movement of said first magnet and pivotal movement of said first pivotal attaching means so that rotation of a pole of said first magnet in response to said forward magnetic field allows the pole of said first magnet to pass by the like pole of the second magnet and positions said first blade aperture over said imaging lens aperture in the presence of the forward magnetic field and positions said third blade aperture over said imaging lens aperture upon the removal of the forward magnetic field; and said second coupling means further comprises:

second pivotal attaching means for pivotally attaching said second magnet to a second pivot point of said aperture blade for applying pivotal movement force to said aperture blade in response to rotational movement of said second magnet; and second limiting means for limiting rotational movement of said second magnet and pivotal movement of said second pivotal attaching means so that rotation of a pole of said second magnet in response to said reverse magnetic field is toward the like pole of the first magnet and positions said second aperture of said blade over said imaging lens aperture in the presence of the reverse magnetic field, and rotates said first magnet back upon termination of the forward magnetic field and thereby return said aperture blade to said stable rest position.

8. The actuator of claim 7 wherein said first and second limiting means further comprise:

means for limiting rotational movement of the like poles of said first and second magnets away from one another in said stable rest position, wherein the like poles of the first and second magnets are in opposition to one another in the absence of forward and reverse current induced magnetic fields;

means for limiting rotational movement of the like pole of said first magnet toward the like pole of said second magnet in response to the forward magnetic field for pivoting said blade into an intermediate aperture position so that the like poles of said first and second magnets repel each other and rotate said first magnet back upon termination of the forward magnetic field and thereby return said aperture blade to said stable rest position; and means for allowing rotational movement of the like pole of said first magnet toward and past the like pole of said second magnet in response to the forward magnetic field so that the like poles of-said first and second magnets repel each other and rotate said first and second magnets into said further stable position upon termination of the reverse magnetic field.

9. The actuator of claim 8 wherein said limiting means further comprises:

means operable when said first and second magnets are in said further stable position and responsive to said reverse magnetic field for rotating said pole of said first magnet back past said like pole of said second magnet into said intermediate aperture position, whereby said first and second magnets rotate back to said stable rest position on termination of said reverse magnetic field.

10. The actuator of claim 9 wherein:

said aperture blade is provided with a third aperture for regulating the amount of light entering an imaging lens aperture when said aperture blade is in said stable rest position and a fourth aperture for regulating the amount of light entering an imaging lens aperture when said aperture blade is in said further stable position.

11. A method of operating an electromagnetically driven actuator supported by a base plate for controlling an aperture blade having at least first and second apertures formed therein for regulating the amount of light entering an imaging lens aperture comprising the steps of:

providing a forward magnetic field of a forward polarity in response to a forward drive current and a reverse magnetic field of a reverse polarity in response to a reverse drive current;

supporting first and second permanent magnets within the influence of their respective magnetic fields and the forward and reverse magnetic fields of said electromagnetic armature and coil for allowing rotational movement of said first magnet and said second magnet about a common axis under the collective influence of said magnetic fields;

coupling said first and second magnets to said blade at first and second pivot points, respectively;

transferring rotational movement of said first magnet in response to a forward magnetic field into pivotal movement of said blade about said second pivot point, whereby said blade is movable between a stable rest position when no current is applied to said armature coil to a first position when a respective forward drive current is applied to said armature coil, so that said blade may position said first aperture over said imaging lens aperture; and transferring rotational movement of said second magnet in response to a reverse magnetic field into pivotal movement of said blade about said first pivot point, whereby said blade is movable between said stable rest position when no current is applied to said armature coil to a second position when a respective reverse drive current is applied to said armature coil, so that said blade may position said second aperture over said imaging lens aperture.

12. The method of claim 11 wherein:

said aperture blade is provided with a further aperture for regulating the amount of light entering an imaging lens aperture when said aperture blade is in said stable rest position.

13. The method of claim 11 wherein said aperture blade is provided with a third aperture and said transferring steps further comprise:

transferring rotational movement of at least one of said first and said second magnets in response to at least one of said forward and said reverse magnetic fields into pivotal movement of said blade to an intermediate stable position on removal of said forward or reverse magnetic field current to position said third aperture over said imaging lens aperture; and transferring rotational movement of the other of said first and second magnets in response to the subsequent application of the other of said forward and said reverse magnetic fields into pivotal movement of said blade from said intermediate stable position back to said stable rest position on removal of the applied magnetic field.

14. The method of claim 13 wherein:

said aperture blade is provided with a fourth aperture for regulating the amount of light entering an imaging lens aperture when said aperture blade is in said stable rest position.

15. An electromagnetically driven actuator supported by a base plate for controlling an aperture blade having at least first and second apertures formed therein for regulating the amount of light entering an imaging lens aperture comprising:

means for providing a forward magnetic field of a forward polarity in response to a forward drive current and a reverse magnetic field of a reverse polarity in response to a reverse drive current;

means for supporting first and second permanent magnets within the influence of their respective magnetic fields and the forward and reverse magnetic fields of said electromagnetic armature and coil for allowing rotational movement of said first magnet and said second magnet about a common axis under the collective influence of said magnetic fields;

means for coupling said first and second magnets to said blade at first and second pivot points, respectively and for moving from a stable rest position of said blade with respect to said imaging aperture in response to prescribed rotation of said first and second magnets;

means responsive to said forward magnetic field for allowing said first and second magnets to align to said forward magnetic field and pivot said blade to align a first aperture thereof with said imaging aperture; and means responsive to said reverse magnetic field for allowing said first and second magnets to align to said reverse magnetic field and pivot said blade to align a second aperture thereof with said imaging aperture.

16. The actuator of claim 15 wherein:

said aperture blade is provided with a further aperture for regulating the amount of light entering an imaging lens aperture when said aperture blade is in said stable rest position.

17. The actuator of claim 15 wherein:

said aperture blade is provided with a third aperture for regulating the amount of light entering an imaging lens aperture when said aperture blade is in an intermediate stable position;

and further comprising:

means responsive to release of said reverse magnetic field for allowing said first and second magnets to rotate to an intermediate stable position and pivot said blade to align said third aperture thereof with said imaging aperture; and means responsive to said forward magnetic field for allowing said first and second magnets to rotate from said intermediate stable position back to said stable rest position and pivot said blade to align said further aperture thereof with said imaging aperture.

18. The actuator of claim 16 wherein:

said aperture blade is provided with a further aperture for regulating the amount of light entering an imaging lens aperture when said aperture blade is in said stable rest position.

* * * * *